US008873074B2

(12) United States Patent
Kasuga

(10) Patent No.: US 8,873,074 B2
(45) Date of Patent: Oct. 28, 2014

(54) DOCUMENT CAMERA APPARATUS AND METHOD FOR CAPTURING, PROCESSING, AND DISPLAYING IMAGE DATA

(75) Inventor: Hirofumi Kasuga, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 623 days.

(21) Appl. No.: 13/022,920

(22) Filed: Feb. 8, 2011

(65) Prior Publication Data

US 2011/0194155 A1 Aug. 11, 2011

(30) Foreign Application Priority Data

Feb. 10, 2010 (JP) ................................ 2010-027333

(51) Int. Cl.
*G06K 15/00* (2006.01)
*H04N 1/21* (2006.01)
*H04N 1/32* (2006.01)
*H04N 1/00* (2006.01)
*H04N 1/195* (2006.01)
*H04N 1/203* (2006.01)
*G09G 5/397* (2006.01)

(52) U.S. Cl.
CPC ........ *H04N 1/203* (2013.01); *H04N 2201/0436* (2013.01); *G09G 5/397* (2013.01); *H04N 1/00448* (2013.01); *H04N 1/19594* (2013.01); *H04N 1/0044* (2013.01); *G09G 2370/20* (2013.01); *H04N 2201/3288* (2013.01); *H04N 1/2038* (2013.01); *G09G 2340/10* (2013.01)
USPC .......................... 358/1.13; 358/1.16; 358/1.18

(58) Field of Classification Search
USPC ............... 358/1.9, 1.13, 1.16–1.18, 537, 538, 358/444, 448, 450, 452, 453; 382/282, 284, 382/276, 293–295, 318
See application file for complete search history.

(56) References Cited

U.S. PATENT DOCUMENTS

| 5,195,174 | A | * | 3/1993 | Kagawa ......................... 358/1.2 |
| 5,635,984 | A | * | 6/1997 | Lee ........................... 348/333.05 |
| 5,764,383 | A | * | 6/1998 | Saund et al. .................. 358/474 |
| 5,818,612 | A | * | 10/1998 | Segawa et al. ................ 358/474 |
| 6,542,260 | B1 | * | 4/2003 | Gann et al. .................... 358/471 |
| 6,750,873 | B1 | * | 6/2004 | Bernardini et al. ........... 345/582 |
| 7,027,085 | B2 | | 4/2006 | Watanabe |
| 7,084,910 | B2 | * | 8/2006 | Amerson et al. ........... 348/231.6 |
| 7,315,643 | B2 | * | 1/2008 | Sakamoto et al. ............ 382/154 |
| 7,428,345 | B2 | * | 9/2008 | Caspi et al. .................. 382/294 |
| 7,756,358 | B2 | * | 7/2010 | Deng et al. .................... 382/284 |
| 8,411,114 | B2 | * | 4/2013 | Akiya ........................... 345/641 |
| 2004/0151365 | A1 | * | 8/2004 | An Chang et al. ............ 382/154 |
| 2005/0088528 | A1 | | 4/2005 | Sambongi et al. |

(Continued)

FOREIGN PATENT DOCUMENTS

| CN | 1407792 A | 4/2003 |
| JP | 2-193484 A | 7/1990 |
| JP | 7-62482 A | 3/1995 |
| JP | 3058026 U | 6/1999 |
| JP | 2004-056207 A | 2/2004 |

(Continued)

*Primary Examiner* — Scott A Rogers
(74) *Attorney, Agent, or Firm* — ALG Intellectual Property, LLC

(57) ABSTRACT

A document camera includes: n (n≥2) imagers; a temporal storage that temporarily stores m sets of image data captured by m (1≤m≤n) imagers among the n imagers; an image processor that performs predetermined image processing according to the number of image data sets m on the m sets of image data stored in the temporal storage; and an output image data output unit that outputs output image data to a display apparatus, the output image data being a single output image data set produced in the predetermined image processing.

18 Claims, 5 Drawing Sheets

(56) References Cited

U.S. PATENT DOCUMENTS

2008/0253685 A1* 10/2008 Kuranov et al. ............. 382/284
2010/0039447 A1* 2/2010 Nakao ........................... 345/634
2012/0154543 A1* 6/2012 Kasuga ......................... 348/47

FOREIGN PATENT DOCUMENTS

| JP | 2004-215298 A | 7/2004 |
| JP | 2005-143091 A | 6/2005 |
| JP | 2005-318023 A | 11/2005 |

* cited by examiner

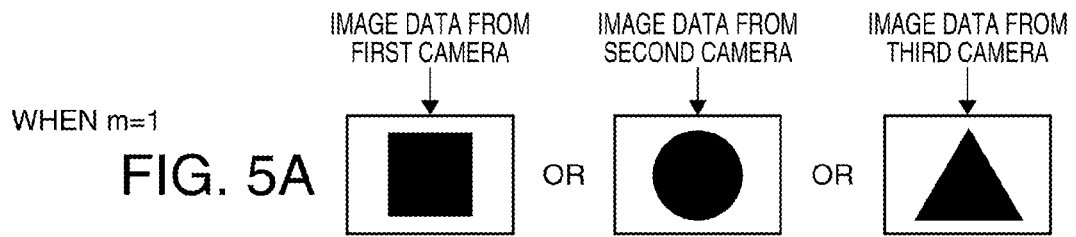
WHEN m=1  FIG. 5A
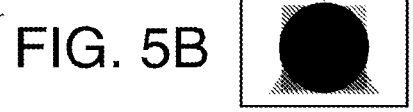
FIG. 5B
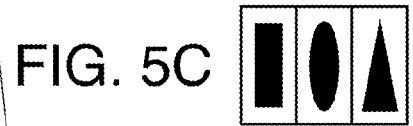
FIG. 5C
WHEN m=2
FIG. 5D
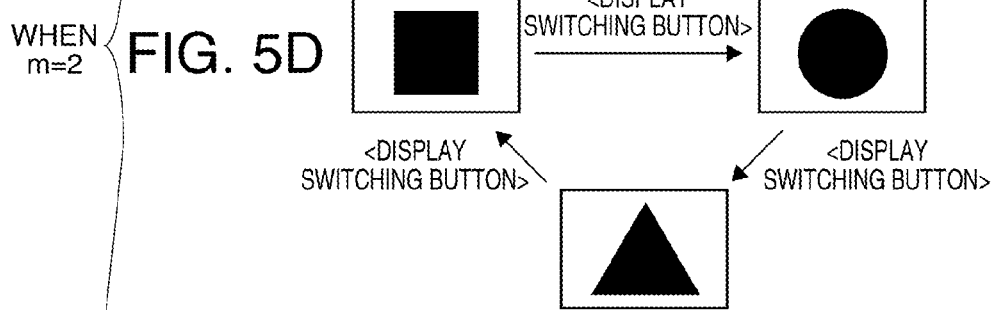
FIG. 5E
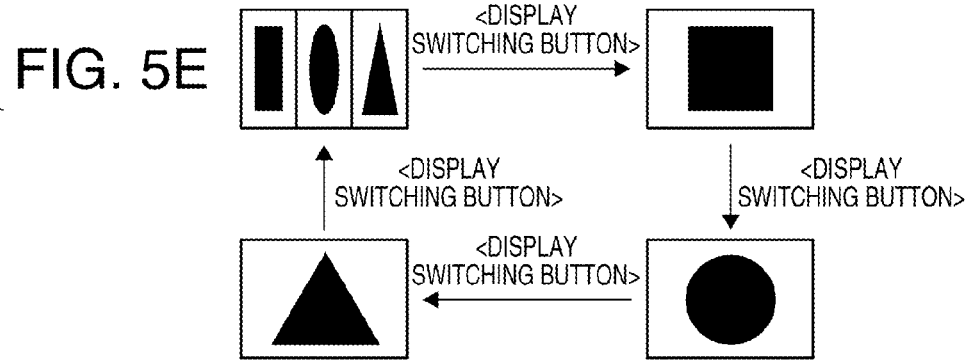

DOCUMENT CAMERA APPARATUS AND METHOD FOR CAPTURING, PROCESSING, AND DISPLAYING IMAGE DATA

BACKGROUND

1. Technical Field

The present invention relates to a document camera that outputs captured image data to a display apparatus, a method for controlling the document camera, and a program.

2. Related Art

There has been a known document camera of this type including a camera stand, a single digital camera so attached to the camera stand that the digital camera can be arbitrarily inclined, and a connector through which image data captured by the digital camera is outputted to a display apparatus (see JP-A-2005-318023). The captured image data is outputted through the connector to the display apparatus and displayed by the display apparatus.

The document camera described above, however, cannot capture and display a plurality of objects to be imaged at the same time. To compare a plurality of objects to be imaged with each other or switch a displayed image among the plurality of objects to be imaged, it is therefore necessary to switch the object under the document camera whenever necessary, which is cumbersome to a user, for example, when a teacher in a school wants to compare a model answer with answers from students or display a problem first and then an answer. To address the inconvenience, it is conceivable to use a plurality of digital cameras (imagers) and output a plurality of image data sets captured by the respective digital cameras to a single display apparatus. In the configuration described above, however, it is necessary to incorporate an image processor that performs image processing on the plurality of image data sets (combining the image data sets, for example) in the display apparatus. In this case, since the document camera can be used only with a display apparatus in which the image processor is incorporated, the versatility of the document camera disadvantageously decreases.

SUMMARY

An advantage of some aspects of the invention is to provide a document camera capable of comparing a plurality of objects to be imaged with each other or switching a displayed image among the plurality of objects to be imaged more conveniently without a special mechanism in a display apparatus. Another advantage of some aspects of the invention is to provide a method for controlling the document camera and a program.

A document camera according to a first aspect of the invention includes n ($n \geq 2$) imagers, a temporal storage that temporarily stores m sets of image data captured by m ($1 \leq m \leq n$) imagers among the n imagers, an image processor that performs predetermined image processing according to the number of image data sets m on the m sets of image data stored in the temporal storage, and an output image data output unit that outputs output image data to a display apparatus, the output image data being a single output image data set produced in the predetermined image processing.

A method for controlling a document camera according to a second aspect of the invention is a method for controlling an overhead camera including n ($n \geq 2$) imagers and a temporal storage, the method including an image capture step of capturing m sets of image data by using m ($1 \leq m \leq n$) imagers among the n imagers, a storage step of temporarily storing the m sets of captured image data in the temporal storage, an image processing step of performing predetermined image processing according to the number of image data sets m on the m sets of image data stored in the temporal storage, and an output image data output step of outputting output image data to a display apparatus, the output image data being a single output image data set produced in the predetermined image processing.

According to the configuration described above, the document camera, which includes n imagers, can capture images of n objects to be imaged at the maximum at the same time and hence display the n objects to be imaged at the same time. A plurality of objects to be imaged can therefore be compared with each other or switched from one to the other more conveniently. Further, since the image processor performs image processing on m ($1 \leq m \leq n$) sets of image data and the output image data output unit outputs a single output image data set produced in the image processing, m ($1 \leq m \leq n$) sets of image data having undergone the image processing can be displayed without a special mechanism in the display apparatus.

It is preferable that the document camera described above further includes an image processing mode selector for selecting an image processing mode when $m \geq 2$, and that the predetermined image processing is a process selected by using the image processing mode selector.

In the method for controlling a document camera described above, it is preferable that the document camera further includes an image processing mode selector for selecting an image processing mode, that the method further includes a selection result acquisition step of acquiring a result of selection made by using the image processing mode selector when $m \geq 2$, and that in the image processing step, the predetermined image processing selected by using the image processing mode selector is performed.

According to the configuration described above, when a single image processing mode is selected from multiple types of image processing mode by using the image processing mode selector, image processing according to the result of the selection is performed on m sets of image data. A user can therefore perform desired image processing by selecting a desired image processing mode. That is, m sets of objects to be imaged can be displayed in a desired display form. The image processing mode used herein means a method for performing image processing, a style in which the image processing is performed, and the form in which the image processing is performed.

In the document camera described above, the image processing mode preferably includes, as the predetermined image processing, a comparison mode in which (m−1) sets of image data among the m sets of image data are processed into transparent image data sets and the m sets of image data are combined into a single output image data set so that the image data sets having undergone the transparency process are superimposed on the remaining image data set not having undergone the transparency process.

According to the configuration described above, since selecting the "comparison mode" by using the image processing mode selector allows m sets of image data to be superimposed and displayed, the m sets of image data can be readily compared with each other. The "comparison mode" can therefore be used, for example, to identify a difference between two figures or compare a plurality of pictures with one another to detect a picture containing an error. Further, when the transparency process is performed on (m−1) sets of image data, and the (m−1) sets of image data are formed of backgrounds and lines, such as texts and diagrams, only the backgrounds preferably undergo the transparency process.

In this case, the image processing mode preferably includes, as the predetermined image processing, a simultaneous display mode in which the m sets of image data are combined into a single output image data set so that the m sets of image data are displayed side by side.

According to the configuration described above, since selecting the "simultaneous display mode" allows the m sets of image data to be displayed side by side, the m sets of image data can be readily compared with each other. The "simultaneous display mode" can therefore be used, for example, when a teacher in a school wants to compare a model answer with answers from students and display the comparison result.

In this case, it is preferable that the image processing mode includes, as the predetermined image processing, an individual switching mode in which m sets of output image data that allow the m sets of image data to be individually displayed are produced, and that the output image data output unit outputs any one of the m sets of output image data sets when the individual switching mode is selected.

According to the configuration described above, selecting the "individual switching mode" by using the image processing mode selector allows any one of the m sets of image data to be displayed as appropriate. The "individual switching mode" can therefore be used, for example, when a teacher in a school displays a problem first and then an answer. To output any one of the m sets of output image data, a single image data set specified by the user may be displayed, or the m sets of output image data may be sequentially displayed one by one, like in a slide show.

In this case, it is preferable that the image processing mode includes, as the predetermined image processing, a composite switching mode in which a first output image data set obtained by combining the m sets of image data so that the m sets of image data are displayed side by side and m sets of second output image data that allow the m sets of image data to be separately displayed are produced, and that the output image data output unit outputs any one of the first output image data set and the m sets of second output image data when the composite switching mode is selected.

According to the configuration described above, selecting the "composite switching mode" by using the image processing mode selector allows any one of the m sets of image data and the single image data set obtained by combining them, (m+1) sets of image data in total, to be displayed as appropriate. The "composite switching mode" can therefore be used, for example, when the user displays a combined image formed of a plurality of pictures displayed side by side, selects a picture including detailed information the user wants to look at from the combined image, and displays the selected picture.

A program according to a third aspect of the invention instructs a computer to carry out the steps in the method for controlling a document camera described above.

According to the configuration described above, the steps in the method for controlling a document camera described above can be carried out by installing the program in a computer.

BRIEF DESCRIPTION OF THE DRAWINGS

The invention will be described with reference to the accompanying drawings, wherein like numbers refer to like elements.

FIG. 5A shows an exemplary displayed image in a "normal mode," FIG. 5B shows an exemplary displayed image in a "comparison mode," FIG. 5C shows an exemplary displayed image in a "simultaneous display mode," FIG. 5D shows an exemplary displayed image in an "individual switching mode," and FIG. 5E shows an exemplary displayed image in a "composite switching mode" in a variation of the document camera.

DESCRIPTION OF EXEMPLARY EMBODIMENTS

Figure 1:
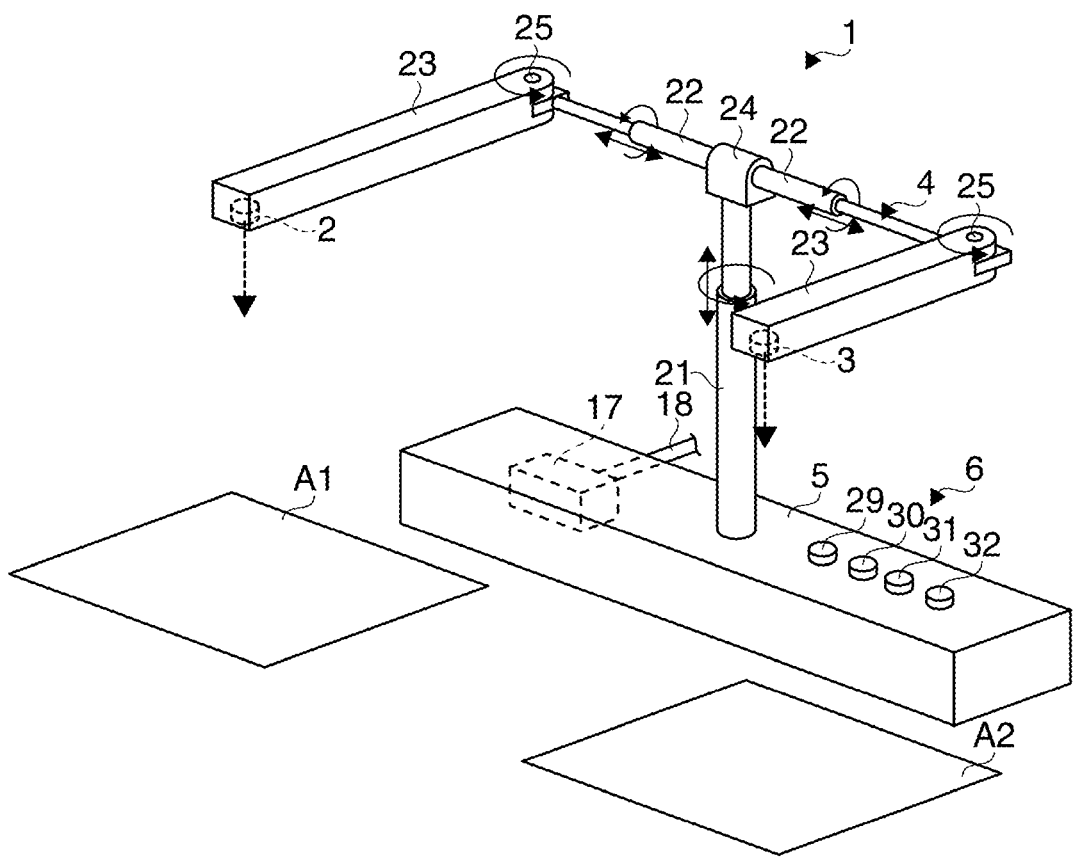
FIG. 1 is a perspective view of a document camera according to an embodiment.
Figure 2:
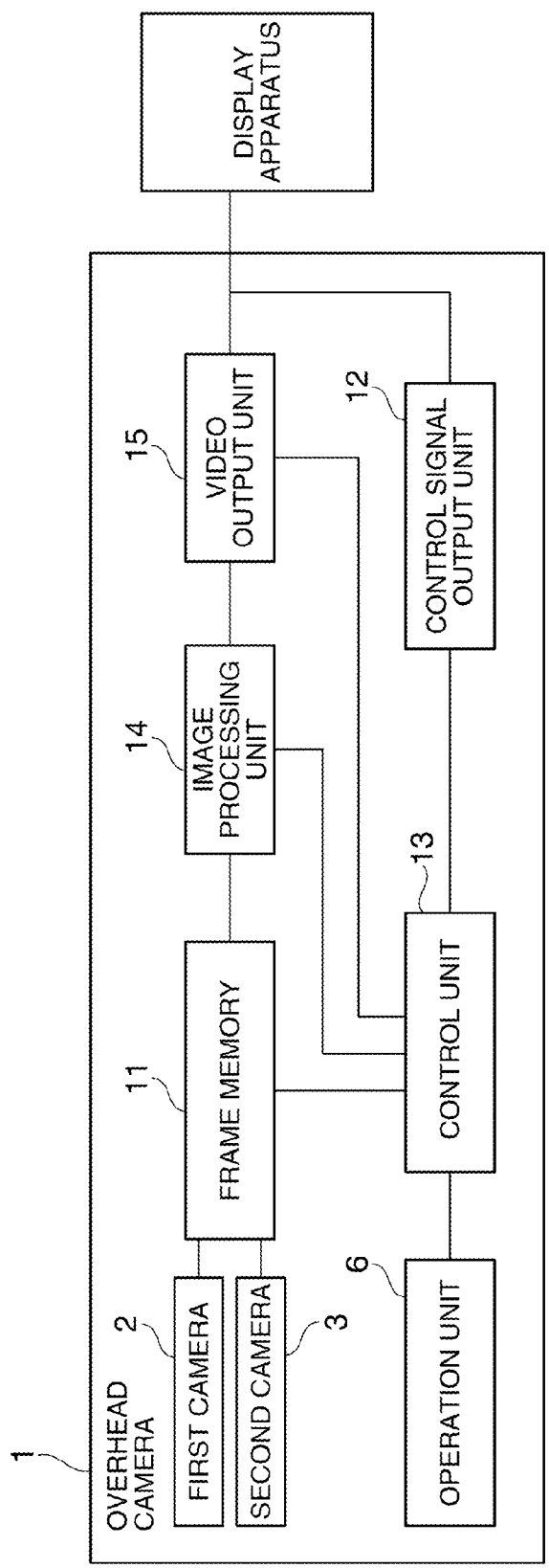
FIG. 2 is a control block diagram of the document camera.

A document camera according to an embodiment of the invention will be described below with reference to the accompanying drawings. As shown in FIGS. 1 and 2, a document camera 1 includes a first camera 2 and a second camera 3 (imagers) that capture images of two objects to be imaged A1 and A2, a camera stand 4 that supports the first and second cameras 2, 3, a support base 5 on which the camera stand 4 stands, and an operation unit 6 disposed on the support base 5. The document camera 1 further includes the following components therein: a frame memory (temporary storage) 11, a control signal output unit 12, a control unit 13, an image processing unit (image processor) 14, and a video output unit (output image data output unit) 15.

In the document camera 1, the first and second cameras 2, 3 capture images of the two objects to be imaged A1 and A2 and produce two image data sets. In the first embodiment, the first camera 2 captures an image of the first object to be imaged A1, and the second camera 3 captures an image of the second object to be imaged A2. Alternatively, a single object to be imaged may be imaged from different angles, or different areas of a single object to be imaged may be imaged as the first and second objects to be imaged A1, A2. For example, open a book and place it under the document camera 1. The right page of the book may be the first object to be imaged A1, and the left page of the book may be the second object to be imaged A2.

The camera stand 4, which supports the first and second cameras 2, 3 in such a way that they can be arbitrarily shifted and inclined, includes a vertical support shaft 21 standing on the support base 5 and extending in the vertical direction, a pair of horizontal support shafts 22, 22 supported at an end of the vertical support shaft 21 and extending in the horizontal direction, and a pair of support frames 23, 23 pivotally supported by engaging portions 25, 25 in a horizontal plane around ends of the horizontal support shafts 22, 22 and having the cameras 2 and 3 attached to ends of the support frames 23, 23. Each of the vertical support shaft 21 and the pair of horizontal support shafts 22, 22 has a slide-in structure formed of a base-side, large-diameter cylindrical tube and a far end-side, small-diameter cylindrical column. The far end-side column is extendable toward the far end and rotatable. The pair of support frames 23, 23 extend in the horizontal direction, and the cameras 2 and 3 are attached to the free ends of the support frames 23, 23, specifically, the lower sides thereof oriented in the vertical direction. The extendable vertical support shaft 21 and horizontal support shafts 22, 22, the rotatable far end-side portions of the vertical support shaft 21 and horizontal support shafts 22, 22, and the pivotal support frames 23, 23 allow the cameras 2 and 3 to be changed in terms of their XYZ positions and angles. The imaging areas of the cameras 2 and 3 can thus be changed as appropriate.

The operation unit 6 has a first power on/off button 29, a second power of/off button 30, a mode switching button (image processing mode selector) 31, and a display switching button 32. The first power on/off button 29 turns on and off the first camera 2, and the second power on/off button 30 turns on and off the second camera 3. The mode switching button 31 switches a display mode, which will be described later. The display switching button 32 switches a displayed image.

The frame memory 11 is a storage that temporarily stores image data captured by the cameras 2 and 3. Specifically, the frame memory 11 temporarily stores m (1≤m≤2) sets of image data captured by one or both of the cameras 2 and 3. The frame memory 11 has data storage areas dedicated to the cameras 2 and 3 and stores captured image data in the data storage areas. That is, the frame memory 11 stores a plurality of image data sets the number of which corresponds to the number of turned-on cameras 2 and 3.

The control signal output unit 12 outputs a control signal containing product information, setting information, and other information on the document camera 1 to a display apparatus (projector, for example).

The control unit 13 selects a single display mode from multiple types of display mode (image processing mode) based on the number of image data sets stored in the frame memory 11 and a signal provided in response to user's operation on the mode switching button and outputs a mode setting signal representing the selected display mode to the image processing unit 14 and the video output unit 15. The control unit 13 further outputs a display switching signal, which is a display switching instruction, to the video output unit 15 based on a signal provided in response to user's operation on the display switching button 32.

The image processing unit 14 produces output image data, which is image data to be outputted, based on not only the instruction (mode setting signal) from the control unit 13 but also the image data stored in the frame memory 11. A plurality of output image data sets, one of which is selected and displayed, are produced in a specific display mode that will be described later in detail.

The video output unit 15 outputs the produced output image data to the display apparatus based on the mode switching signal and the display switching signal. The control signal output unit 12 and the video output unit 15 include a common terminal 17 (see FIG. 1) having a video output terminal, a USB terminal, or any other suitable terminal and is connected to the display apparatus via a cable 18.

A description will be made of the display mode with reference to FIGS. 3A to 3E. The display mode, which depends on the number of image data sets m stored in the frame memory 11, includes a "normal mode" selected when m=1, and a "comparison mode," a "simultaneous display mode," an "individual switching mode," and a "composite switching mode" selectable when m=2.

Figure 3:
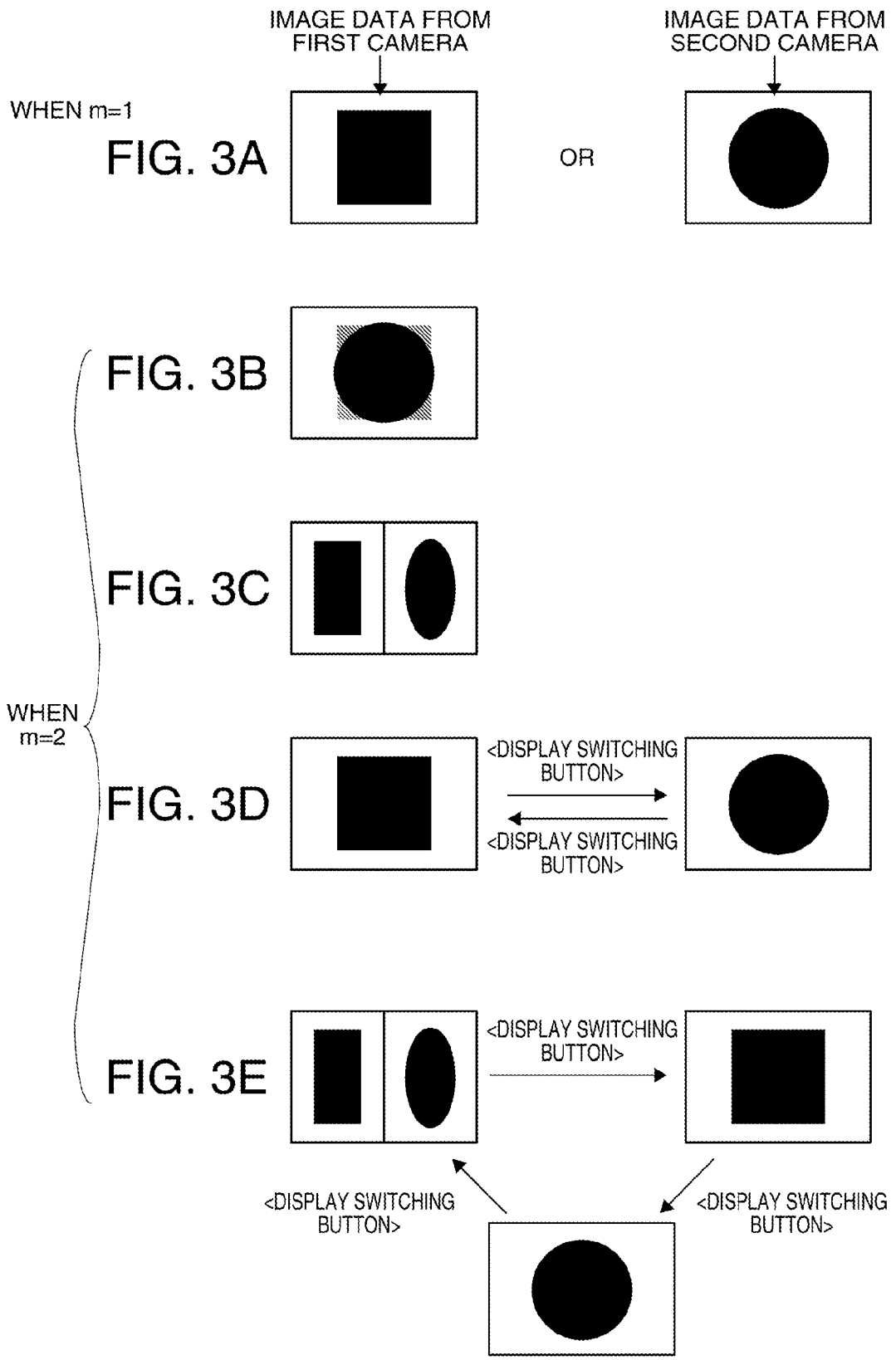
FIG. 3A shows an exemplary displayed image in a "normal mode.
" FIG. 3B shows an exemplary displayed image in a "comparison mode.
" FIG. 3C shows an exemplary displayed image in a "simultaneous display mode.
" FIG. 3D shows an exemplary displayed image in an "individual switching mode.
" and FIG. 3E shows an exemplary displayed image in a "composite switching mode".

In the "normal mode," only one image data set stored in the frame memory 11 is displayed, as shown in FIG. 3A. In the "normal mode," the image processing unit 14 adjusts the size of one of the image data sets stored in the frame memory 11 so that the image data is displayed across a screen of the display apparatus. In addition to the size adjustment, standard image processing, such as data format conversion, is performed in the "normal mode." A single output image data set is thus produced. In the example shown in FIG. 3A, image data on a square figure (image data from the first camera 2) or image data on a circular figure (image data from the second camera 3) is displayed.

In the "comparison mode," two image data sets stored in the frame memory 11 are superimposed and displayed, as shown in FIG. 3B. In the "comparison mode," the image processing unit 14 processes one of the two image data sets stored in the frame memory 11 into a transparent image and combines the two image data sets in such a way that the image data having undergone the transparency process is overlaid (superimposed) on the other image data, which has not undergone the transparency process. The resultant image data then undergoes the size adjustment and the standard image processing described above. A single output image data set is thus produced. In the example shown in FIG. 3B, the image data on the square figure (image data from the first camera 2) undergoes the transparency process and is then overlaid on the image data on the circular figure (image data from the second camera 3), and the resultant image is displayed.

In the "simultaneous display mode," two image data sets stored in the frame memory 11 are displayed side by side, as shown in FIG. 3C. In the "simultaneous display mode," the image processing unit 14 reduces the size of two image data sets stored in the frame memory 11 and combining the two image data sets so that they are displayed side by side. The resultant image data then undergoes the standard image processing described above. A single output image data set is thus produced. In the example shown in FIG. 3C, image data on the square figure (image data from the first camera 2) and image data on the circular figure (image data from the second camera 3) are reduced in size in the horizontal direction and displayed side by side. As a result, the square figure has become a vertically elongated rectangle, and the circular figure has become a vertically elongated ellipse.

In the "individual switching mode," two image data sets stored in the frame memory 11 are switched back and forth and one image data set is displayed at a time, as shown in FIG. 3D. In the "individual switching mode," the image processing unit 14 performs the same image processing as that in the "normal mode" separately on two image data sets stored in the frame memory 11 to produce two output image data sets. That is, the same image processing as that in the "normal mode" is repeated twice. As a result, two output image data sets from the respective cameras 2 and 3, one of which is selected and displayed, are produced. In the example shown in FIG. 3D, image data on the square figure (image data from the first camera 2) and image data on the circular figure (image data from the second camera 3) are back and forth and one image data set is displayed at a time.

In the "composite switching mode," two image data sets stored in the frame memory 11 and an image data set obtained by combining the two image data sets are switched and one image data set is displayed at a time, as shown in FIG. 3E. In the "composite switching mode," the image processing unit 14 reduces the size of two image data sets stored in the frame memory 11 and combining the two image data sets so that they are displayed side by side to produce a single output image data set (first output image data set). The image processing unit 14 further performs the same image processing as that in the "normal mode" separately on the two image data sets to produce two output image data sets (second output image data sets). As a result, the combined output image data set and the output image data sets from the respective cameras, three image data sets in total, one of which is selected and displayed, are produced. In the example shown in FIG. 3E, image data on the square figure (image data from the first camera 2), image data on the circular figure (image data from the second camera 3), and image data produced by reducing them in size and displaying them side by side are switched and one image data set is displayed at a time.

Figure 4:
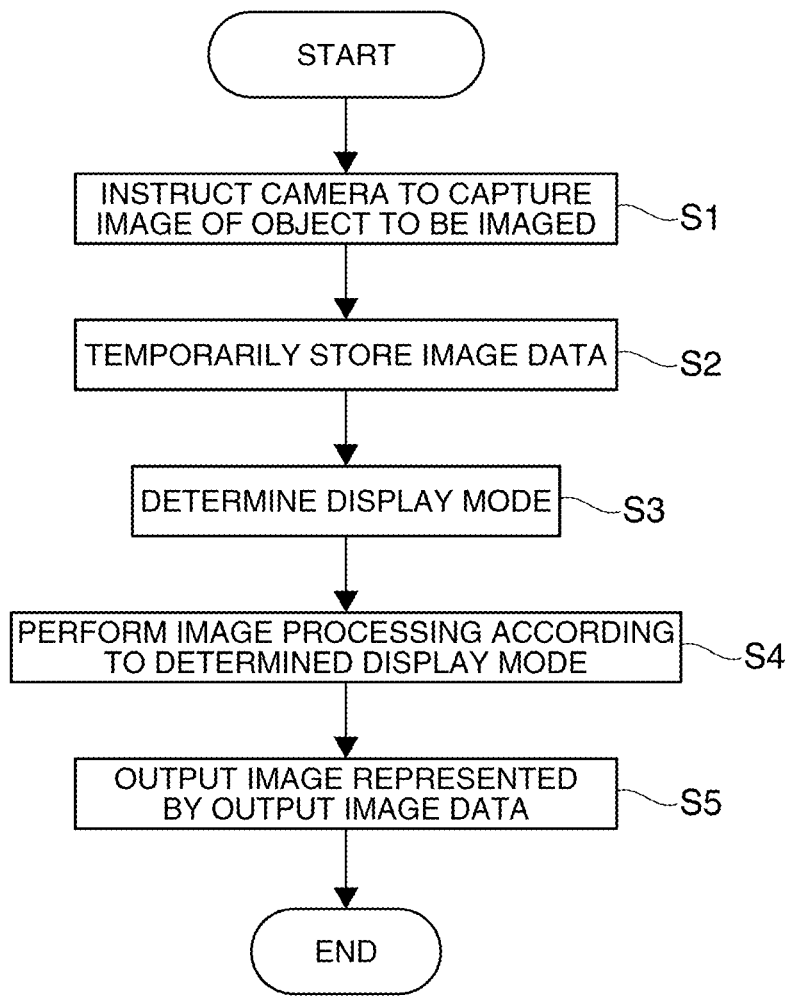
FIG. 4 is a flowchart showing how the document camera outputs images.

A description will next be made of how the document camera 1 outputs images with reference to the flowchart in FIG. 4. In the image output process, the cameras 2 and 3 first capture images of the objects to be imaged A1 and A2 (image capture step S1), as shown in FIG. 4. That is, m (1≤m≤2, m is an integer) cameras having been turned on out of the two cameras 2 and 3 capture images of the objects to be imaged A1 and A2 to produce a single image data set for each of the objects to be imaged A1 and A2 (m sets of image data in total). The frame memory 11 then temporarily stores m sets of the captured image data (storage step S2).

The control unit 13 subsequently determines the display mode based on the number of image data sets m stored in the frame memory 11 and a signal provided in response to user's operation on the mode switching button 31 (S3). Specifically, the control unit 13 checks the number of image data sets m stored in the frame memory 11 and selects the "normal mode" as the display mode when m=1. In this case, even when the mode switching button 31 is operated, the operation is ignored. On the other hand, when m=2, the user presses the mode switching button 31 to sequentially switch the display mode among the "comparison mode," the "simultaneous display mode," the "individual switching mode" and the "composite switching mode" and determines the display mode. That is, when m=2, the control unit 13 receives a signal provided in response to user's operation on the mode switching button 31 (result of selection) (selection result acquisition step) and determines the display mode.

The image processing unit 14 then performs the predetermined image processing described above according to the determined display mode on the m sets of image data stored in the frame memory 11 to produce output image data (image processing step S4). As described above, in the "normal mode," the "comparison mode," and the "simultaneous display mode," a single output image data set is produced. In the "individual switching mode," two output image data sets are produced. In the "composite switching mode," three output image data sets are produced. Since the display mode depends on the number of image data sets m stored in the frame memory 11 as described above, image processing corresponding to the "normal mode" is performed when m=1. On the other hand, when m=2, image processing corresponding to any of the "comparison mode," the "simultaneous display mode," the "individual switching mode," and the "composite switching mode" is performed based on the result of selection made by using the mode switching button 31. That is, the image processing unit 14 performs image processing according to the number of stored image data sets m.

When the image processing unit 14 produces a single output image data set (in the "normal mode," the "comparison mode," and the "simultaneous display mode"), the video output unit 15 outputs the produced output image data set, whereas when the image processing unit 14 produces a plurality of output image data sets (in the "individual switching mode" and "composite switching mode"), the video output unit 15 selects an output image data set to be outputted in accordance with the acquired display switching signal and outputs the selected image data set (S5). That is, in the "individual switching mode," the video output unit 15 selects a single output image data set in response to user's operation on the display switching button 32 from two output image data sets having been produced and outputs the selected image data set. In the "composite switching mode," the video output unit 15 selects a single output image data set from three output image data sets having been produced and outputs the selected image data set.

As described above, the document camera 1 of the first embodiment, which includes the two cameras 2 and 3, can capture images of two objects to be imaged at the maximum, the two objects to be images A1 and A2, at the same time and hence display the two objects to be imaged A1 and A2 at the same time. A plurality of objects to be imaged A1 and A2 can therefore be compared with each other or switched from one to the other more conveniently. Further, since the image processing unit 14 produces a single output image data set to be outputted from m sets of image data and the video output unit 15 outputs the produced image data set, m sets of image data having undergone image processing can be displayed without a special mechanism in the display apparatus.

Further, since the mode switching button 31 can be used to select a single display mode from multiple types of display mode, desired image processing can be performed. That is, the two objects to be images A1 and A2 can be displayed in a desired display form.

Moreover, since selecting the "comparison mode" allows two image data sets to be superimposed and displayed, the two image data sets can be readily compared with each other. The "comparison mode" can therefore be used, for example, to identify a difference between two figures or compare a plurality of pictures with one another to detect a picture containing an error.

Still further, since selecting the "simultaneous display mode" allows two image data sets to be displayed side by side, the two image data sets can be readily compared with each other. The "simultaneous display mode" can therefore be used, for example, when a teacher in a school wants to compare a model answer with answers from students and display the comparison result.

Further, when there are two image data sets, selecting the "individual switching mode" allows one of the two image data sets to be displayed as appropriate. The "individual switching mode" can therefore be used, for example, when a teacher in a school displays a problem first and then an answer.

Further, when there are two image data sets and a single image data set obtained by combining the two image data sets, selecting the "composite switching mode" allows any one of the three image data sets to be displayed as appropriate. The "composite switching mode" can therefore be used, for example, when the user displays a combined image formed of a plurality of pictures displayed side by side, selects a picture including detailed information the user wants to look at from the combined image, and displays the selected picture.

In the first embodiment, two cameras 2 and 3 are provided and up to two objects to be images A1 and A2 are imaged and displayed. Alternatively, it is conceivable to provide n (n≥2, n is an integer) cameras. Specifically, three or more cameras may be provided, and a greater number of objects to be imaged may be imaged and displayed. In this case, the "normal mode" is selected as the display mode when m=1, whereas the display mode is determined by switching it among the "comparison mode," the "simultaneous display mode," the "individual switching mode," and the "composite switching mode" when m≥2.

For example, consider a case where three cameras are provided (n=3), as shown in FIGS. 5A to 5E. When m=1, select the "normal mode" and perform the size adjustment described above on a single image data set stored in the frame memory 11 to produce a single output image data set. Only the single image data set stored in the frame memory 11 is thus displayed (see FIG. 5A).

On the other hand, when m≥2 (m=3 in FIGS. 5A to 5E), select the "comparison mode," for example. Among m sets of image data stored in the frame memory 11, perform the transparency process on (m−1) sets of image data and overlay the image data sets having undergone the transparency process on the remaining image data not having undergone the transparency process to combine the image data sets into a single output image data set. The m sets of image data stored in the frame memory 11 are thus superimposed and displayed (see FIG. 5B).

When the "simultaneous display mode" is selected, m sets of image data stored in the frame memory 11 are reduced in size and combined into a single output image data set so that the m sets of image data are displayed side by side. The m sets of image data stored in the frame memory 11 are thus displayed side by side (see FIG. 5C).

When the "individual switching mode" is selected, the same image processing as that in the "normal mode" is separately performed on m sets of image data stored in the frame memory 11 and m sets of output image data are produced. The m sets of image data stored in the frame memory 11 are thus switched and one image data set is displayed at a time (see FIG. 5D).

When the "composite switching mode" is selected, m sets of image data stored in the frame memory 11 are reduced in size and combined into a single output image data set so that the m sets of image data are displayed side by side (first output image data set), and the same image processing as that in the "normal mode" is separately performed on the m sets of image data to produce m sets of output image data (second output image data sets). In this way, the m sets of image data stored in the frame memory 11 and the image data obtained by combining them, (m+1) sets of image data in total, are switched and one image data set is displayed at a time (see FIG. 5E).

Further, when the "comparison mode" is selected, the transparency process is performed on the entire area of each of the (m−1) sets of image data in the first embodiment. Alternatively, when the (m−1) sets of image data are formed of backgrounds, lines, and points, such as texts and diagrams, only the backgrounds may undergo the transparency process. That is, it is judged whether or not image data in question satisfies the condition described above, and when the condition is satisfied, only the backgrounds may undergo the transparency process, whereas when the condition is not satisfied, the entire area of each image data may undergo the transparency process.

Further, in the "individual switching mode" and the "composite switching mode," the display switching button 32 is used to switch (select) a displayed image in the first embodiment. Alternatively, m sets of output image data or (m+1) sets of output image data may be sequentially displayed one by one, like in a slide show.

Further, in the "simultaneous display mode," m sets of image data are displayed side by side along the horizontal direction in the first embodiment. Alternatively, the image data sets may be displayed side by side along the vertical direction or the direction along which the image data sets are displayed side by side may be chosen (horizontal or vertical direction). Still alternatively, when m≥4, image data sets may be displayed in a matrix formed of horizontal rows and vertical columns.

When m≥2, the mode selection is performed in the first embodiment, but the mode selection may not be necessarily performed. In this case, the type of image processing to be performed is uniquely determined in accordance with the number of image data sets m stored in the frame memory 11. For example, the type of image processing is conceivably set as follows: When the number of image data sets is one, image processing corresponding to the "normal mode" described above is performed. When the number of image data sets is two (m=2), image processing corresponding to the "comparison mode" described above is performed. When the number of image data sets is three (m=3), image processing corresponding to the "comparison mode" described above is performed. The type of image processing may, of course, be changed in accordance with the number of image data sets. For example, when the number of image data sets is two (m=2), image processing corresponding to the "comparison mode" described above may be performed, and when the number of image data sets is three (m=3), image processing corresponding to the "simultaneous display mode" described above may be performed.

In the first embodiment, the document camera 1 is wired to the display apparatus via the cable 18 and outputs output image data. The first embodiment may alternatively be configured in such a way that the document camera 1 is wirelessly connected to the display apparatus and outputs output image data. In this case, the document camera 1 has a built-in battery. The document camera 1 may alternatively be connected to the display apparatus via a PC (Personal Computer). That is, the document camera 1 is connected to the PC via a USB terminal and the PC is connected to the display apparatus via a USB terminal so that the document camera 1 outputs image data to the display apparatus via the PC. This configuration is useful, for example, when a large-screen display apparatus (such as a large display and a projector) is used to show output image data to a large number of people at once in a school or any other similar place, that is, when it is difficult for a presenter (user) to check a displayed image on the display apparatus. The output image data being displayed on the display apparatus can be readily checked by displaying the output image data on a display screen of the PC. Further, the display mode and the output image data can be checked and then switched.

Although no description has been made in the first embodiment, output image data may be still image data or video image data.

In the first embodiment, the video output unit 15 successively outputs produced output image data. In addition to this, the produced output image data may be stored on a recording medium (USB memory or SD memory card). In this case, since the output image data can be stored, the output image data can be not only used another time but also transferred or stored. Output image data may be stored as still image data, or when output image data is formed of a plurality of continuous images, the output image data may be stored as video image data.

In the first embodiment, selectable display modes include the "comparison mode," the "simultaneous display mode," the "individual switching mode," and the "composite switching mode," but all the modes are not necessarily provided. The selectable display modes may alternatively include at least one of the modes. For example, the selectable display modes may include only one of the display modes and another display mode other than the display modes described above.

The entire disclosure of Japanese Patent Application No. 2010-027333, filed Feb. 10, 2010 is expressly incorporated by reference herein.

What is claimed is:

1. A document camera comprising:

n (n≥2) imagers;

a storage that temporarily stores m sets of image data captured by m (1≤m≤n) imagers among the n imagers;

an image processor that determines a quantity of m sets of image data stored in the storage, determines a type of predetermined image processing, from a plurality of predetermined image processing types, based on the quantity of m sets of image data, and performs predetermined image processing according to the type of predetermined image processing corresponding to the quantity of m sets of image data stored in the storage; and an output image data output unit that outputs image data to a display apparatus, the image data being a single image data set produced in the predetermined image processing, wherein the type of predetermined image processing is determined regardless of a selection input from an operator of the document camera when the quantity of m sets of image data is equal to a predetermined quantity, and the type of predetermined image processing is determined in accordance with the selection from the operator of the document camera when the quantity of m sets of image data is not equal to the predetermined quantity.

2. The document camera according to claim 1, further comprising an image processing mode selector for selecting an image processing mode when m≥2, wherein the predetermined image processing is a process selected by using the image processing mode selector.

3. The document camera according to claim 2, wherein the image processing mode includes, as the predetermined image processing, a comparison mode in which (m−1) sets of image data among the m sets of image data are processed into transparent image data sets and the m sets of image data are combined into a single image data set so that the image data sets having undergone the transparency process are superimposed on the remaining image data set not having undergone the transparency process.

4. The document camera according to claim 2, wherein the image processing mode includes, as the predetermined image processing, a simultaneous display mode in which the m sets of image data are combined into a single image data set so that the m sets of image data are displayed side by side.

5. The document camera according to claim 2, wherein the image processing mode includes, as the predetermined image processing, an individual switching mode in which m sets of image data that allow the m sets of image data to be individually displayed are produced, and the image data output unit outputs any one of the m sets of image data sets when the individual switching mode is selected.

6. The document camera according to claim 2, wherein the image processing mode includes, as the predetermined image processing, a composite switching mode in which a first image data set obtained by combining the m sets of image data so that the m sets of image data are displayed side by side and m sets of second image data that allow the m sets of image data to be separately displayed are produced, and the image data output unit outputs any one of the first image data set and the m sets of second image data when the composite switching mode is selected.

7. The document camera according to claim 1, wherein the predetermined image processing comprises a comparison mode in which background image data among the m sets of image data is identified, the background image among the m sets of image data is transitioned to transparency, and the m sets of image data are superimposed into a single image data set.

8. The document camera according to claim 1, wherein the image processor is configured to detect a user selection of a portion of the single image data set, identify an image data set, of the m sets of image data, corresponding to the portion selected, and output a new image data set comprising the selected portion of the single image data set for display.

9. A method for controlling a document camera including n (n≥2) imagers and a storage, the method comprising:

capturing m sets of image data by using m (1≤m≤n) imagers among the n imagers;

temporarily storing the m sets of captured image data in the storage;

determining a quantity of m sets of image data stored in the storage, determining a type of predetermined image processing, from a plurality of predetermined image processing types, based on the quantity of m sets of image data, and performing predetermined image processing according to the type of predetermined image processing corresponding to the quantity of m sets of image data stored in the storage; and outputting image data to a display apparatus, the image data being a single image data set produced in the predetermined image processing, wherein the type of predetermined image processing is determined regardless of a selection input from an operator of the document camera when the quantity of m sets of image data is equal to a predetermined quantity, and the type of predetermined image processing is determined in accordance with the selection from the operator of the document camera when the quantity of m sets of image data is not equal to the predetermined quantity.

10. The method for controlling a document camera according to claim 9, wherein the document camera further includes an image processing mode selector for selecting an image processing mode, the method further comprising a selection result acquisition of acquiring a result of selection made by using the image processing mode selector when m≥2, and in the image processing, the predetermined image processing selected by using the image processing mode selector is performed.

11. A non-transitory computer-readable medium storing a program that instructs a computer to carry out in the method for controlling a document camera according to claim 9.

12. A non-transitory computer-readable medium storing a program that instructs a computer to carry out in the method for controlling a document camera according to claim 10.

13. A document camera comprising:

n (n≥2) imagers;

a storage that temporarily stores m sets of image data captured by m (1≤m≤n) imagers among the n imagers;

an image processor that performs predetermined image processing according to the number of m sets of image data stored in the storage;

an output image data output unit that outputs image data to a display apparatus, the image data being a single image data set produced in the predetermined image processing; and an image processing mode selector for selecting an image processing mode when $m \geq 2$, wherein the predetermined image processing is a process selected by using the image processing mode selector, and the image processing mode includes, as the predetermined image processing, a comparison mode in which (m−1) sets of image data among the m sets of image data are processed into transparent image data sets and the m sets of image data are combined into a single image data set so that the image data sets having undergone the transparency process are superimposed on the remaining image data set not having undergone the transparency process.

14. A document camera comprising:

n ($n \geq 2$) imagers;

a storage that temporarily stores m sets of image data captured by m ($1 \leq m \leq n$) imagers among the n imagers;

an image processor that performs predetermined image processing according to the number of m sets of image data stored in the storage;

an output image data output unit that outputs image data to a display apparatus, the image data being a single image data set produced in the predetermined image processing; and an image processing mode selector for selecting an image processing mode when $m \geq 2$, wherein the predetermined image processing is a process selected by using the image processing mode selector, and the image processing mode includes, as the predetermined image processing, at least two of:
- a simultaneous display mode in which the m sets of image data are combined into a single image data set so that the m sets of image data are displayed side by side,
- a comparison mode in which the m sets of image data are superimposed onto one another into a single image data set, and
- an individual switching mode in which m sets of image data allow the m sets of image data to be individually displayed are produced.

15. The document camera according to claim 14, wherein the image processing mode includes at least the simultaneous display mode and the comparison mode.

16. A document camera comprising:

n ($n \geq 2$) imagers;

a storage that temporarily stores m sets of image data captured by m ($1 \leq m \leq n$) imagers among the n imagers;

an image processor that determines a quantity of m sets of image data stored in the storage, determines which types of predetermined image processing, from a plurality of predetermined image processing types, are available for image processing, based on the quantity of m sets of image data, receives a selection input, corresponding to at least one of the predetermined image processing types available for image processing, from a user of the document camera, and performs predetermined image processing according to the at least one of the predetermined image processing types corresponding to the selection input received from the user of the document camera; and an output image data output unit that outputs image data to a display apparatus, the image data being at least one image data set produced in the predetermined image processing, wherein the type of predetermined image processing is selected regardless of the selection from the operator of the document camera when the quantity of m sets of image data is equal to a predetermined quantity, and the type of predetermined image processing is selected according to the selection from the operator of the document camera when the quantity of m sets of image data is not equal to the predetermined quantity.

17. The document camera according to claim 16, wherein the predetermined quantity is one set of image data, the type of predetermined image processing selected when the quantity of m sets of image data is equal to the predetermined quantity comprises a normal mode, wherein the one set of image data is displayed, and the type of predetermined image processing selected when the quantity of m sets of image data is not equal to the predetermined quantity comprises at least one of a comparison mode, a simultaneous display mode, an individual switch mode, and a composite switching mode.

18. A document camera comprising:

n ($n \geq 2$) imagers;

a storage that temporarily stores m sets of image data captured by m ($1 \leq m \leq n$) imagers among the n imagers;

an image processor that performs predetermined image processing according to the number of m sets of image data stored in the storage;

an output image data output unit that outputs image data to a display apparatus, the image data being a single image data set produced in the predetermined image processing; and an image processing mode selector for selecting an image processing mode when $m \geq 2$, wherein the predetermined image processing is a process selected by using the image processing mode selector, the image processing mode includes, as the predetermined image processing, a composite switching mode in which a first image data set obtained by combining the m sets of image data so that the m sets of image data are displayed side by side and m sets of second image data that allow the m sets of image data to be separately displayed are produced, and the image data output unit outputs any one of the first image data set and the m sets of second image data when the composite switching mode is selected.

* * * * *